United States Patent [11] 3,621,182

[72] Inventor Jean-Pierre Peyrot
 8, domaine du Bel-Abord, Chilly-Mazarin, Essonne, France
[21] Appl. No. 880,714
[22] Filed Nov. 28, 1969
[45] Patented Nov. 16, 1971
[32] Priority Nov. 29, 1968
[33] France
[31] 176,113

[54] ROTARY WELDING GUN
 9 Claims, 11 Drawing Figs.
[52] U.S. Cl. .................................... 219/125 R, 219/60 A
[51] Int. Cl. ..................................... B23k 9/12
[50] Field of Search............................. 219/124, 125 R, 130, 60 A, 60 R, 61

[56] References Cited
UNITED STATES PATENTS
| | | | |
|---|---|---|---|
| 2,908,805 | 10/1959 | Apblett et al. | 219/125 |
| 3,125,669 | 3/1964 | Hawthorne | 219/125 |
| 3,134,894 | 5/1941 | Farnsworth | 219/125 |
| 3,142,745 | 7/1964 | Gotch | 219/125 |
| 3,159,734 | 12/1964 | Cooksey et al. | 219/125 |
| 3,207,408 | 9/1965 | Thome et al. | 219/125 X |
| 3,345,494 | 10/1967 | Apblett et al. | 219/125 |

Primary Examiner—J. V. Truhe
Assistant Examiner—L. A. Schutzman
Attorney—Karl W. Flocks ABSTRACT: A rotary welding gun comprising a handle, an intake of gas utilized to prevent any oxidation of the weld, an inlet of cooling water, an electric current input, all the intakes being contained in a conduit in the interior of the handle, a built-in motor driving an axial shaft, a positioning mandrel projecting towards the exterior round the said axial shaft at its free extremity opposite to that of the motor, a centering means, a torch-mounted eccentric radially with respect to said mandrel, axial-adjusting means for the position of the torch, expansion means adjustable in relation to the mandrel so as to center said mandrel radially with respect to the internal surface of a tube to be welded, at the same time permitting rotation of the mandrel inside the tube.

PATENTED NOV 16 1971 3,621,182

Inventor:
Jean-Pierre Peyrot
By
Karl W. Flocks
Attorney

ROTARY WELDING GUN

The present invention relates to a rotary welding gun and more particularly to a gun for automatic welding with a tungsten electrode under a protective flux of gas by the TIG process.

The invention provides a gun which can be employed for welding tubes on thick plates irrespective of the dimensions chosen by the welder, comprising members for controlling with accuracy the gas and water circuits and also the passage of current as a function of the position of the electrodes during the execution of the weld.

The invention has also for its object to provide a device which permits:

Interchangeability of the mandrel and the torch in the case of the execution of internal and external welds;

Adjustment of the position of the electrode during operation;

Complete cooling of the torch portion.

The invention has also for its object to provide:

Rotary joints for electricity, gas and water, thus avoiding twisting of the cables and piping systems;

A built-in motor;

A pulse transmitter permitting the sequences of welding to be controlled.

The invention will be described with particular reference to its application to certain welding techniques, in particular external welding without filler metal of a ring of small thickness fitted into a hole formed in a plate, and more particularly to the welding of tubes on plates of heat exchangers, together with the internal welding of tubes on heat exchangers and internal welding of tubes or butt-welding of tubes.

Other characteristic features and advantages of the invention will be brought out in the description which follows below with reference to the accompanying drawings, giving purely by way of indication but not in any limitative sense, one form of embodiment of the invention.

In the Drawings

Figure 10:
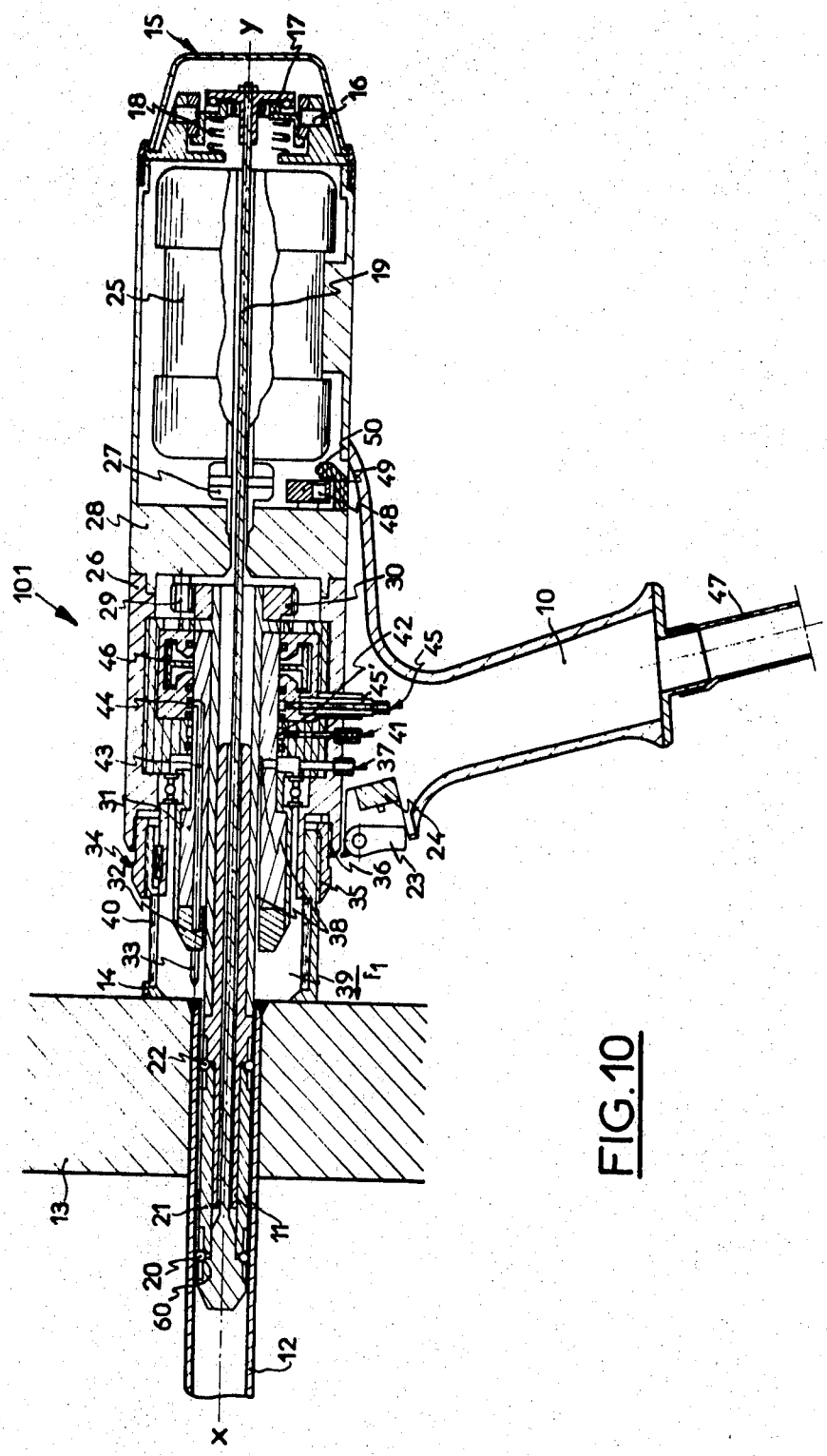
FIG. 10 is a view in cross section of a gun for external welding according to the invention.

In FIG. 10 there is shown a gun indicated as a whole by the reference 101, comprising a handle 10, through the interior of which pass a sheath 47 containing the inlet pipes for gas 37, water 41, and the current input cables 45 and the return water conduit 45'.

A motor 25 drives the coupling 27 which actuates the rotation of the mandrel 11 on which are fixed the torches 33.

In order to use the gun 101 for carrying out an external weld in the direction of the arrow $f_1$, without filler metal, of a tube 12 of small thickness fitted into the interior of a housing formed in a thick plate 13, the method of procedure is as follows:

The gun is taken in one hand by the handle 10, the mandrel 11 is inserted into the tube 12 to be welded on the plate 13, until the stop 14 touches the plate 13. An adjusting knob 15 which drives the nipples 16 is then rotated. The assembly 17, comprising helicoidal sloping faces held against the nipples 16 by the effect of the spring 18, causes the shaft 19 to move back axially. By means of its conical portion 60, this shaft then forces the balls 20 outwards and pushes the sleeve 21 which in turn forces the balls 22 outwards. The mandrel is thus expanded and has enabled the gun to be centered in the tube 12. This expansion of the mandrel does not prevent its rotation, since the balls 20 and the sleeve 21 serve as its ball bearing.

The welding operation is carried out by pressing the trigger 23 which closes an electric contactor 24. This contactor initiates the complete welding sequence, that is to say: sweeping of gas, starting an arc by high frequency, setting in rotation; when so required, preheating by rapid rotation of the torch 31-33 with an arc of low power, welding, smoothing of the weld by increasing the speed, gradual extinction of the arc, sweeping with gas and stopping. The control of these sequences presumes an initial reference of the angular position of the electrode. It is well understood that a first rotation is carried out so as to check that there are no mechanical difficulties, but this is done without starting-up the arc.

The rotation of the shaft is ensured by starting-up the electric motor 25 rigidly fixed on the fixed body 26 of the gun. The rotation of the motor shaft is transmitted by a coupling 27 to a speed reduction gear 28, the output pinion 29 of which drives the gear system 30. This gearing drives in rotation, because they are fixed together, the torch support 31 on which is fixed the torch extremity 32 and its electrode 33. The interchangeability of the torch extremity 32 and the electrode 33 makes it possible to effect variations in the angular and diametral positions of the electrode, which in consequence provides the possibility of welding different arrangements as shown in FIGS. 1 to 6, together with the welding diameter.

The adjustment of the distance between the electrode and the joint to be welded is effected by rotation of the part 34 which comprises two oppositely threaded portions 35 and 36. Rotation of the part 34 in one direction or the other enables the fixed body 26 of the gun to be moved away from or closer to the abutment 14, the body 26 carrying the electrode 33 with it during this lateral movement. The gas employed for preventing oxidation of the weld is supplied at 37 and then through the conduits 38 so as to pass into the chamber 39. The observation of the welding operation is made through the transparent quartz tube 40. The cooling water is brought in at 41 into the circular groove 42, from which it is led to the end of the torch extremity 32 by an identical conduit at 43. It then returns through the conduit 43 into the groove 44 and is evacuated at 45. Through the interior of this conduit passes a metal cable 45' which supplies the welding current and transmits it through a rotating mercury passage 46 to the torch support 31 and by contact to the torch 32.

These rotary joints, gas intake and water supply, water return, current input, constitute a rotating assembly complete, the fluid-tightness of which is ensured by rotary joints which makes it possible to have fixed cables and supply pipes which pass out through the handle at 47. The device according to the invention avoids twisting of the supply cables, which is a considerable defect in conventional rotating welding machines.

In order to carry out the welding operation in an entirely automatic manner, and therefore to effect all the sequences necessary for a cycle of welding, to regulate these various sequences as required and to be able to vary the welding parameters automatically according to requirements, an impulse transmitter is incorporated in the gun. The impulses act on the speed of the motor, the flow-rate of gas and the welding current.

This pulse transmitter comprises for example a small permanent magnet 48 fixed on a rotating shaft 49 passing out of the reduction gear 28, the angular speed of this shaft being 100 revolutions for one revolution of the electrode 33. This magnet passes at each rotation of the shaft 49 in front of two separated spring blades in a bulb 50 under vacuum, and at each passage brings the two blades in contact with each other, closing a circuit for a fraction of a second. It is by means of these circuit closures every one-hundredth of a revolution of the electrode, that it is possible to intervene at each instant during the course of the welding sequences, taking a reference on the rotation of the shaft and not on the position of the parts to be welded 12 and 13. This makes it possible to eliminate any undesirable incident which could be caused by an accidental minimum movement of the gun.

Figure 1:
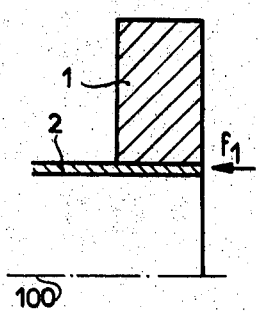
FIGS. 1 to 6 are views in radial section of various arrangements for external welding of tubes on thick plates.
Figure 2:
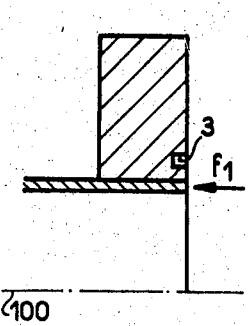
Figure 3:
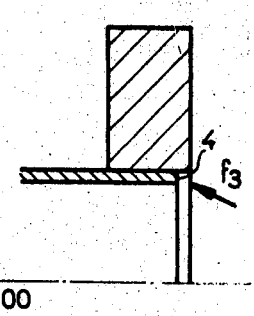
Figure 4:
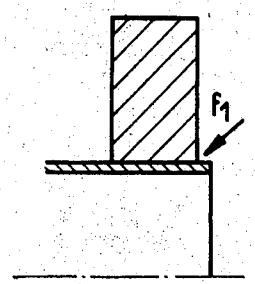
Figure 5:
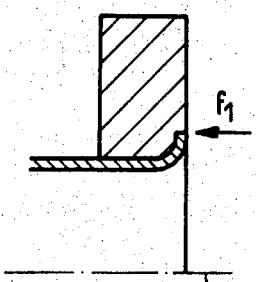
Figure 6:
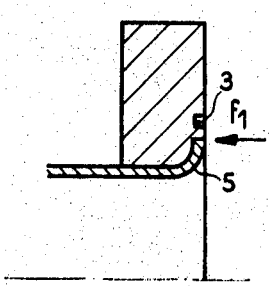
Figure 7:
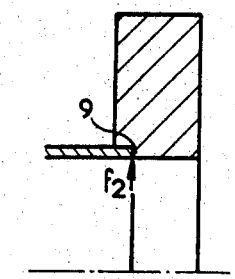
FIGS. 7 and 8 are views in radial cross section of various arrangements for the internal welding of tubes on thick plates.
Figure 8:
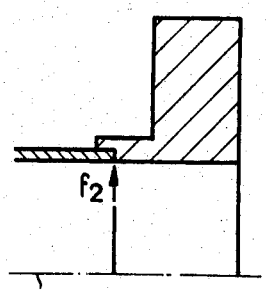
Figure 9:
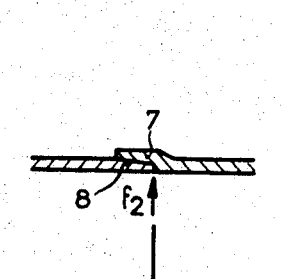
FIG. 9 is a view in cross section of a tube with a joint welded by internal welding.
Figure 11:
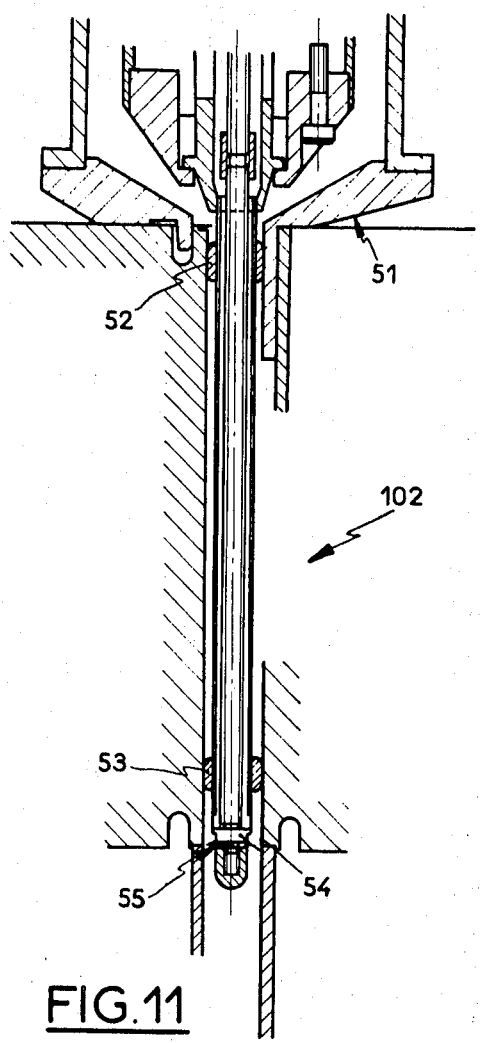
FIG. 11 is a view in partial cross section of a gun for internal welding according to the invention.

For internal welding corresponding to the arrangements of the welds of FIGS. 7, 8 and 9, the mandrel 11 of FIG. 10 is removed and replaced either by a centering member 51 (FIG. 11) or by rings 52 and 53, the torch (FIG. 10) being removed and replaced by the torch 54 (FIG. 11) on which is fixed the electrode 55.

In this case of internal welding in the direction of the arrow $f_2$, the axial distance from the electrode to the joint to be welded of the gun 102 is not adjustable, but on the other hand rotation of the part 34, which ensures the lateral movement of the gun body 26 carries with it in this movement the torch 54, making it possible to regulate the position of the electrode 55 with respect to the joint to be welded.

It will of course be understood that the present invention has been described above purely by way of indication and not in any limitative sense, and that any modifications may be made thereto, in conformity with its spirit, without thereby departing from its scope. In particular, it comprises all the alternative forms, especially those in which thin tubes are to be welded on thick or thin plates by external welding of the end of the tube, thin tubes on thick or thin plates by internal welding, thin tubes or thin sleeves on thin tubes or sleeves by internal welding.

What I claim is:

1. A rotary welding gun comprising a handle, an inlet for the intake of gas utilized to prevent any oxidation of the weld, an inlet of cooling water, an inlet for electric current input, all said inlets being contained in a conduit in the interior of the handle, a built-in motor driving an axial shaft, a positioning rotational joining mandrel projecting towards the exterior around the said axial shaft at its free extremity opposite to that of the motor, a centering means controlling said mandrel from a distance, a torch mounted eccentric radially with respect to the rotational axis of the centering position of said mandrel, axial adjusting means for the position of the torch, expansion means adjustable in relation to the mandrel at its extremities on two levels inside a pipe to be welded so as to center from far away said mandrel radially with respect to the internal surface of the pipe to be welded, at the same time permitting rotation of expansion means of the mandrel against the internal wall of the pipe.

2. A welding gun as claimed in claim 1, in which said centering means controls two bearings of balls disposed at said two levels by means of a sleeve included between said two ball bearings, said ball bearings being housed between two conical rings respectively provided, on the one hand, on the extremities of the sleeve and on the other hand, on the extremity of said shaft connected to said centering means and on the periphery of said joining mandrel.

3. A welding gun as claimed in claim 1 and further comprising a torch support, a torch extremity, an electrode, the position of said torch with respect to the parts to be welded being fixed axially by means of a stop integral with the gun which is abutting with the pipe to be welded before the closing of the clamp and a threaded mounting permitting the electrode to be displaced axially inside the gun with respect to said stop.

4. A welding gun as claimed in claim 1, and further comprising an adjusting knob for controlling the said expansion of the mandrel.

5. A welding gun as claimed in claim 4, in which said adjusting knob is located at the breech of the gun so as to displace said axial shaft axially with respect to said mandrel and thus to force said balls radially towards the exterior with respect to the sleeve, so as to apply the external surface of the balls against the internal surface of the pipe while permitting said balls to rotate.

6. A welding gun as claimed in claim 1, in which said torch is totally compacted inside the external diameter of the rotational parts.

7. A welding gun as claimed in claim 1 in which said expansion means comprises a spring to allow sufficient elasticity to said bearings during their rotational path.

8. A welding gun as claimed in claim 1 comprising a transparent quartz tube.

9. A welding gun as claimed in claim 1 comprising a rotating mercury contact for the alimentation of the current of said torch.

* * * * *